United States Patent
Hoshino

[11] Patent Number: 6,160,261
[45] Date of Patent: Dec. 12, 2000

[54] METHOD FOR PRODUCING CHIRED IN-FIBER BRAGG GRATING

[76] Inventor: Hiroyuki Hoshino, 1-17-2, Narusawacho, Hitachi-shi, Japan

[21] Appl. No.: 09/357,655

[22] Filed: Jul. 20, 1999

[30] Foreign Application Priority Data

| Jul. 21, 1998 | [JP] | Japan | 10-204594 |
| Nov. 18, 1998 | [JP] | Japan | 10-9120 |
| Nov. 27, 1998 | [JP] | Japan | 10-337236 |
| Mar. 2, 1999 | [JP] | Japan | 11-53906 |

[51] Int. Cl.[7] .............. G02B 6/34; G21K 5/08; G21K 5/10
[52] U.S. Cl. .......... 250/492.1; 385/37; 427/553
[58] Field of Search .......... 250/492.1; 385/37; 427/553

[56] References Cited

U.S. PATENT DOCUMENTS

| 5,857,043 | 1/1999 | Cook et al. | 385/37 |
| 5,867,618 | 2/1999 | Ito et al. | 385/37 |
| 6,043,497 | 3/2000 | Quetel | 250/492.1 |

FOREIGN PATENT DOCUMENTS

| 0 843 186 | 5/1998 | European Pat. Off. | |
| WO 97 26570 | 7/1997 | WIPO | |
| WO 98 07058 | 2/1998 | WIPO | |

OTHER PUBLICATIONS

Abstract of U.S. Patent No. 5,718,738. (A copy of the U.S. Patent should be available to the Examiner.).

*Primary Examiner*—Jack Berman
*Attorney, Agent, or Firm*—Armstrong, Westerman, Hattori, McLeland & Haughton

[57] ABSTRACT

Disclosed is a method for producing a chirped in-fiber Bragg grating, in which an interval between gratings varies continuously depending on a location of the gratings observed along an optical fiber, comprising a first step of winding the optical fiber in a spiral groove formed around a conical bobbin which is shaped in a frustum of a right circular cone having a predetermined vertex angle and a height between predetermined first and second diameters, and a second step of irradiating the optical fiber wound on the conical bobbin with ultraviolet rays at every crossing of the optical fiber with a predetermined number of uniformly distributed generating lines of the conical bobbin, each extending radially on the surface of the conical bobbin from an imaginary vertex thereof, for modifying the refractive index of a core of the optical fiber to form the grating at the every crossing.

8 Claims, 5 Drawing Sheets

SUBSTRATE FOR PHOTOMASK

METHOD FOR PRODUCING CHIRED IN-FIBER BRAGG GRATING

FIELD OF THE INVENTION

The present invention relates to a method for producing a chirped in-fiber Bragg grating, in which an interval between gratings varies continuously depending on the location of the gratings observed along an optical fiber.

BACKGROUND OF THE INVENTION

An optical fiber exhibits dispersion across a spectrum of light. This poses a severe limitation on a high-bit-rate data transmission by TDM or WDM techniques over a long distance optical fiber telecommunication line. Due to dispersion, every wave-length component of a light pulse starting from one end of a transmission line does not simultaneously arrive at the other end. When there occurs an excessive dispersion among the wave-length components, it becomes difficult to distinguish a front pulse from a rear one to process them.

One of ways for compensating dispersion is to introduce a delay-time-to-wave-length relationship, which is the reversal of the dispersion, into the transmission line at a relay point or a receiving point, by giving a greater delay time to a shorter wave-length component of light which runs faster in the transmission line and arrives earlier at the destination, and a smaller delay time to a longer wave-length component of light which runs slower and arrives later, to cancel differences in the arrival time among the wave-length components, viz the dispersion. As shown in FIG. 8, an optical circuit for compensating dispersion, comprising chirped Bragg gratings contained in an optical fiber 16 (hereinafter, a "chirped in-fiber Bragg grating" or "CFBG") and an optical circulator 17, has been proposed (Hill, K. O., et al, Optics Letters, 1994, 19, (17), pp 1314–1316, for instance).

In FIG. 8, a signal of light entering into a transmission line 18 from a source of light (not-illustrated) in the left, is subjected to dispersion in the long distance transmission line 18, and enters into the optical circulator 17 at an entrance a. The optical circulator 17 provides a relay point b to which the CFBG 16 is connected. In the CFBG 16, a multiplicity of Bragg gratings for reflecting a range of wave-length components of light are arranged, in which an interval between each pair of gratings (grating interval) varies continuously depending on the location of the gratings observed along the optical fiber. The compensated signal of light comes out at an exit c of the optical circulator 17.

One of wave-length components of light entering into the CFBG 16 from the relay point b is Bragg reflected in a region where the grating interval g satisfies: g=m×wave length of light in fiber/2 (m is an integer between 1–5, a diffraction mode), and returns to the relay point b. Other wave-length components having no connection with the above grating interval g simply pass through there. Gratings for reflecting (or resonant to) a longer wave-length component are placed nearer the relay point b, and those resonant to a shorter wave-length component, remoter. The fiber length between gratings for reflecting the maximum and minimum wave-length components is selected so that a round-trip time required by light for travelling that length is equal to the total dispersion time caused by the transmission line 18. A shorter wave-length component of light comes out from the CFBG 16 at the relay point b after consuming a greater delay time than that a longer wave-length component does in the CFBG 16. Thus, compensation of dispersion is attained in the signal of light coming-out at the exit c.

Now, suppose that dispersion suffered by a spectrum of light whose wave-lengths in vacuum are between 1.5 $\mu$m and 1.6 $\mu$m is compensated with the CFBG 16. Assuming m=4 and refractive index of glass=1.45, grating intervals for the wave lengths 1.6 $\mu$m and 1.5 $\mu$m are calculated to be g=2.207 $\mu$m and g=2.069 $\mu$m, respectively. Gratings having g=2.207 $\mu$m are placed near the relay point b, those having g=2.069 $\mu$m the other end, and those ranging between g=2.207 $\mu$m and g=2.069 $\mu$m are distributed in the middle of the CFBG 16.

The length of the transmission line whose dispersion can be compensated with the CFBG 16 is proportionate to the length thereof. The total dispersion time suffered by the above-mentioned 0.1 $\mu$m spectrum of light in a 50 km transmission line, for example, is 85 ns (assuming that the rate of dispersion is 17 ps/nm/km), and the length of the CFBG having a round-trip time of 85 ns is 8.8 meters. If the length of the CFBG 16 is doubled to 17.6 meters, it becomes possible to compensate dispersion in a 100 km transmission line. However, to build the dispersion compensation circuit shown in FIG. 8, it is necessary to obtain a CFBG of as high precision and large length as described in the above.

FIGS. 9A and 9B illustrate conventional methods for producing a CFBG. In FIG. 9A, an optical fiber is in contact with a photomask having slits and irradiated with ultraviolet (UV) rays. In FIG. 9B, an optical fiber is continuously moved in the axial direction, and intermittently irradiated with UV rays. In either case, it is necessary to repeat positioning the optical fiber with a determined tension force, and irradiating the fiber with the UV rays. However, there has been a problem of stitching error in the gratings, in which the grating interval varies abruptly at places because of difficulty in precisely positioning the optical fiber every time. With such incomplete CFBG, a precise dispersion compensation can not be attained, due to irregular reflection caused by disorderly gratings. Another problem is difficulty in producing a long enough CFBG capable of compensating dispersion in a transmission line of 100 km class, because of repeated positioning and irradiation of the UV rays.

SUMMARY OF THE INVENTION

The present invention provides a method for producing a CFBG having a high precision and a large length, in which an interval of gratings varies continuously depending on the location of the gratings observed along an optical fiber.

The method for producing the CFBG according to the present invention comprises, a first step of winding an optical fiber in a spiral groove formed around a conical bobbin which is shaped in a frustum of a right circular cone having a predetermined vertex angle and a height between predetermined first and second diameters, and a second step of irradiating the optical fiber wound on the conical bobbin with UV rays at every crossing of the optical fiber with a predetermined number of uniformly distributed generating lines of the conical bobbin, each extending radially on the surface of the conical bobbin from an imaginary vertex thereof, for modifying the refractive index of a core of the optical fiber to form the grating at the every crossing.

Owing to the conical bobbin employed in the present invention, the CFBG having an extended length greater than ever may be produced easily.

From the geometry of the conical bobbin, a length from the beginning of winding of the optical fiber to a reference grating in the optical fiber has a specific relationship to a circumference of the conical bobbin in a right conic section where the reference grating resides. On the other hand, the circumference is divided by generating lines (or generatrixes) of the conical bobbin into a predetermined number of uniform arcs, each of which spaces one grating from another. Thus, an interval between every pair of gratings varies continuously depending on the location of the gratings observed along the optical fiber.

First to third preferred embodiments for implementing the above-mentioned production method are provided in the description, and there is a fourth embodiment in which preferable derivative products of the CFBG are shown.

In the first preferred embodiment, a photomask is used for irradiating the optical fiber with the UV rays. In the second preferred embodiment, a cylindrical lens is used for focusing the UV rays in a line crossing with the optical fiber wound on the conical bobbin. In the third preferred embodiment, a convex lens is used for forming a focused spot of the UV rays on the optical fiber wound on the conical bobbin.

It is necessary to divide the circumference of the conical bobbin into a predetermined number of uniform arcs, for preparing the photomask in the first embodiment, or specifying the line or point of exposure on the optical fiber with the UV rays in the second or third embodiment. Several kinds of dividing (or encoding) apparatus for this purpose are illustrated in the description. However, existing similar apparatus may be used if a high enough resolution is provided.

BRIEF DESCRIPTION OF THE DRAWING

The present invention can be further understood by reference to the following description and attached drawing which illustrates the preferred embodiments. In the drawing.

DESCRIPTION OF THE PREFERRED EMBODIMENTS

First Embodiment

In the first embodiment of the production method according to the present invention, an apparatus for producing the CFBG is provided, which comprises, a conical bobbin shaped in a frustum of a right circular cone having a predetermined vertex angle and a height between predetermined first and second diameters, provided with a spiral groove formed on the surface thereof for winding an optical fiber, a photomask shaped in a thin and hollow frustum of a right circular cone for covering the surface of the conical bobbin closely, the photomask being provided with a predetermined number of uniformly distributed light passing slits, each extending radially along the surface of the photomask from an imaginary vertex thereof, a motor for rotating the conical bobbin and the photomask together around a common axis, and a UV laser placed outside the conical bobbin and the photomask, pointing perpendicular to the surface of the conical bobbin, interposed by a cylindrical lens for focusing laser rays in a line along a generating line of the conical bobbin.

Figure 1:
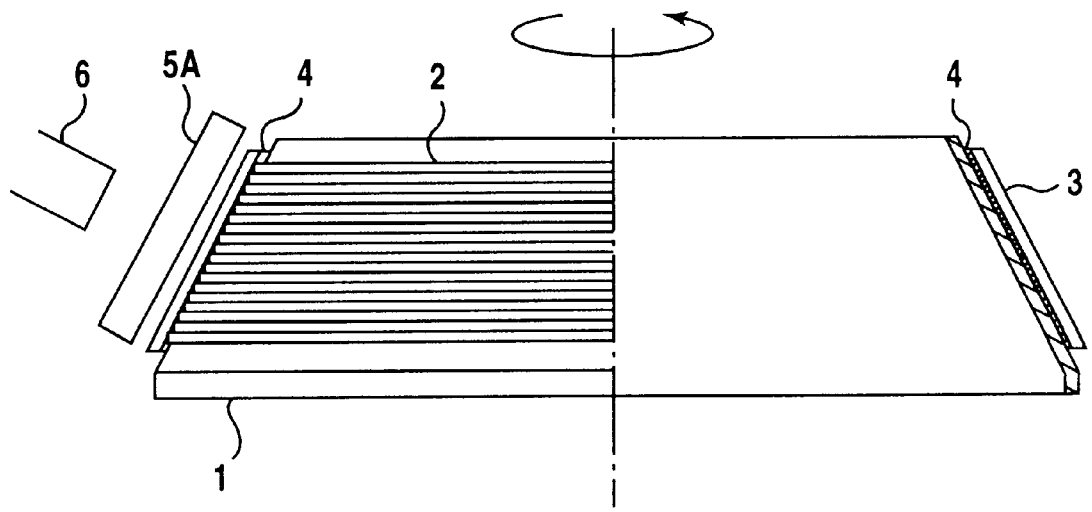
FIG. 1 illustrates an apparatus for producing a CFBG in a first preferred embodiment of the present invention.

FIG. 1 illustrates an apparatus for producing a CFBG provided in the first embodiment of the present invention. In FIG. 1, the reference numeral 1 denotes a conical bobbin, shown by a partially broken side-view including a central axis. 2 denotes an optical fiber wound in a spiral groove formed around the conical bobbin 1, in which cross-sections of the fiber are shown in a chain of small circles. The reference numeral 4 denotes a photomask, 5A a cylindrical lens, and 6 a UV laser. The UV laser 6 is placed with its axis perpendicular to the surface of the conical bobbin 1, interposed by the cylindrical lens 5A. Light passing slits 3 extend radially on the entire surface of the photomask 4.

In designing the conical bobbin, a first diameter of the conical bobbin 1 is determined based on the minimum grating interval corresponding to the minimum wave-length of light to be Bragg reflected, and a second diameter of the conical bobbin 1 is determined based on the ratio of the maximum to minimum wave-lengths. A number into which the whole circumference of the conical bobbin 1 is divided is determined based on the minimum grating interval and the first diameter, or the maximum grating interval and the second diameter. A total dispersion time is given by the spectrum width of light in use and the length of the transmission line, from which a length of a CFBG necessary for dispersion compensation is determined. A number of turns in winding the optical fiber is determined from the length of the CFBG and the first and second diameters. By determining a winding pitch of the spiral groove, or the interval between neighboring spiral lines, a total width of the spiral groove, ie the distance between the first and second diameters, is determined. From the total width of the spiral groove and the first and second diameters, a vertex angle of the conical bobbin is determined.

A design case is described with reference to FIG. 1, in which a conical bobbin 1 and a photomask 4 are prepared for producing a CFBG 16 having a length of 17.6 meters for compensating dispersion suffered by a spectrum of light whose wave-lengths range between 1.5 $\mu$m and 1.6 $\mu$m, in a 100 km transmission line.

In the produced CFBG 16, gratings having g=2.069 $\mu$m are formed near an end, those having g=2.207 $\mu$m the other end, and those ranging between g=2.069 $\mu$m and g=2.207 $\mu$m are distributed in the middle of the CFBG 16. On the photomask 4, 162,000 light passing slits are formed radially at every 8 angular seconds around the axis thereof.

When the gratings having g=2.069 $\mu$m are formed near the beginning of, and those having g=2.207 $\mu$m near the end of the winding on the conical bobbin 1, with the 8 seconds light passing slits, the first and second diameters need to be 106.7 and 113.8 mm, respectively. When the 17.6 meters optical fiber is wound on the conical bobbin 1 at an average winding pitch of 0.184 mm / turn, 50.8 turns are necessary, which produce a wound width of 9.35 mm of the winding measured in the axial direction of the conical bobbin 1. From the first and second diameter, and the wound width of the winding, the vertex angle of the conical bobbin 1 is determined to be 44.64°.

The photpmask 4 is formed in a thin and hollow frustum of a right circular cone, preferably of quartz glass, having a vertex angle of 44.64° which is the same as the conical bobbin 1.

In the above example, the length of the CFBG has been assumed to be 17.6 meters. It is preferable, however, to produce a little longer one having margins at both ends, by making the first diameter a little smaller and the second diameter a little larger than those described in the above. Even in this situation, a 17.6 meters portion of the CFBG described above is included somewhere in the total length of the produced CFBG, provided that conditions of the 8 seconds interval between the light passing slits and the vertex angle of 44.64° are met. The margins at both ends may be utilized to adapt the CFBG to fractions in the length of the transmission line.

A rigorous calculation of an extended length of the optical fiber 2 wound on the conical bobbin 1 at a constant pitch, includes a first order term and a small second order term of a wound width of winding measured in the axial direction of the conical bobbin 1. As a result, the mid-point of the total fiber length is located at a point deviated slightly from the middle of the wound width toward the second diameter. On the other hand, the grating having the central value of grating intervals is located precisely at the middle of the wound width. This means that gratings resonant to a central wave-length in the spectrum of light are located in a region deviated slightly from the middle of the produced CFBG.

However, the winding pitch of the spiral groove is not necessarily uniform. To compensate the geometric nature of the conical bobbin described in the above, and to locate the gratings resonant to the central wave-length at the middle of the produced CFBG, a varying winding pitch exemplified by the following equation may be employed.

$$p(x) = \pi\{D_1 W + (D_2 - D_1)x\}/L$$

where, x is an independent variable in the axial direction of the conical bobbin, p(x) the varying winding pitch [mm / turn], W the total wound width, $D_1$ the first diameter, $D_2$ the second diameter, and L the length of the produced CFBG.

It is preferable to bond the optical fiber 2 at places while it is being wound on the conical bobbin 1. Upon finishing winding, the photomask 4 is put on to cover the optical fiber 2 wound on the conical bobbin 1 closely. The conical bobbin 1, together with the photpmask 4 is set on a rotating table (not illustrated) coaxially. The surface of the photomask 4 is irradiated with UV rays from the UV laser 6 through the cylindrical lens 5A, while the rotating table is rotated at 1 RPM, for instance. In this way, every crossing of the optical fiber 2 with the light passing slits 3 of the photomask 4 is irradiated with UV rays, and the refractive index of the core of the optical fiber 2 is modified so that a grating is formed there. In the produced CFBG, the grating interval varies continuously depending on the locations of the gratings observed along the optical fiber.

The above descriptions concerning the conical bobbin 1 hold true in the second or third embodiment described later, too.

Figure 2:
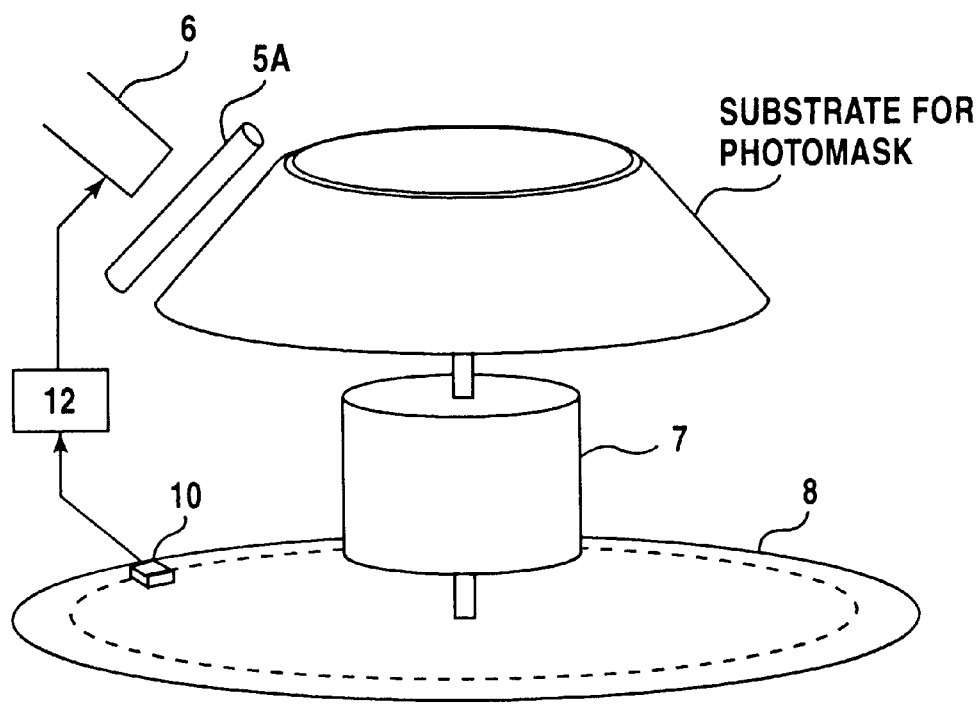
FIG. 2 illustrates an apparatus for preparing a photomask used in the first preferred embodiment.

An example of apparatus for producing the photomask by utilizing a full circle protractor is described with reference to FIG. 2.

A substrate for the photomask is shaped in a thin and hollow frustum of a right circular cone of quartz glass having the same vertex angle as the conical bobbin 1, covered on the surface with a thin metal film for shielding light, and covered on top of the metal film with a layer of photoresist. The full circle protractor 8 consists of a signal recording disk which is pre-recorded with pulse signals on a circular recording track at every 8 angular seconds interval around an axis of the recording disk, which is the angular space to be given to the light passing slits 3 of the photomask 4. UV rays from the UV laser 6 is focussed by a cylindrical lens 5A in a line along one of generating lines of the photomask 4.

A motor 7 rotates the substrate and the full circle protractor 8 coaxially, and a read/write head 10 detects the pulse signals recorded on the full circle protractor 8. The output signals from the read/write head 10 are given to the UV laser 6 through a pulse shaping circuit 12 to make the UV rays to blink. Thus, the surface of the substrate is irradiated with UV rays at the angular interval of 8 seconds, and etched thereafter to form light passing slits 3 in the metal film.

Second Embodiment

In the second embodiment of the production method according to the present invention, another apparatus for producing the CFBG is provided, which comprises, a conical bobbin shaped in a frustum of a right circular cone having a predetermined vertex angle and a height between predetermined first and second diameters, provided with a spiral groove formed on the surface thereof for winding an optical fiber, a dividing mechanism for generating a blinking signal every time the conical bobbin together with the dividing mechanism rotates a unit angle, a predetermined integer times the unit angle making one revolution, a motor for rotating the conical bobbin and the dividing mechanism together around a common axis, a UV laser placed outside the conical bobbin, pointing perpendicular to the surface of the conical bobbin, interposed by a cylindrical lens for focusing laser rays of the UV laser in a line along a generating line of the conical bobbin, and a blinker mechanism for causing the UV rays to blink responsive to the blinking signal from the dividing mechanism.

Figure 3:
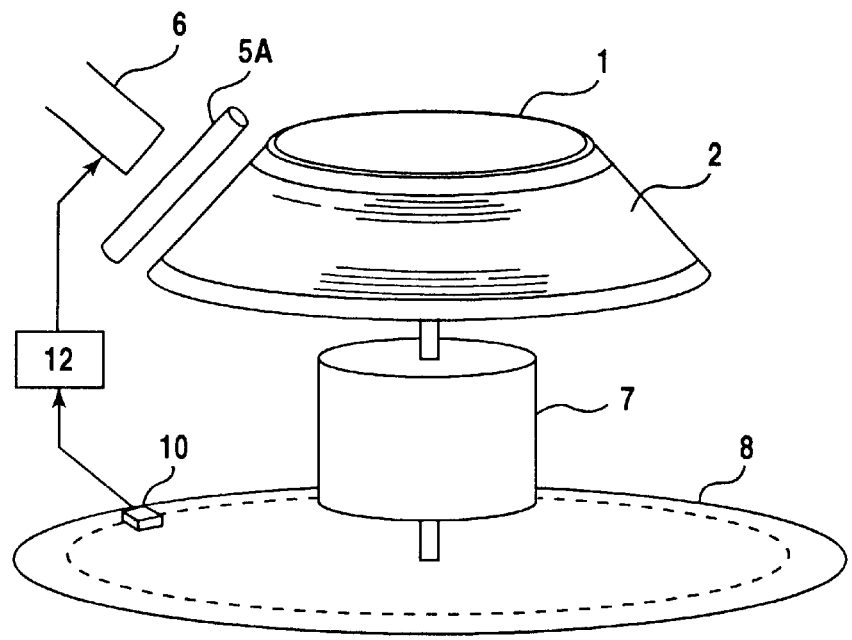
FIG. 3 illustrates an example of apparatus for producing a CFBG in a second preferred embodiment of the present invention.
Figure 4:
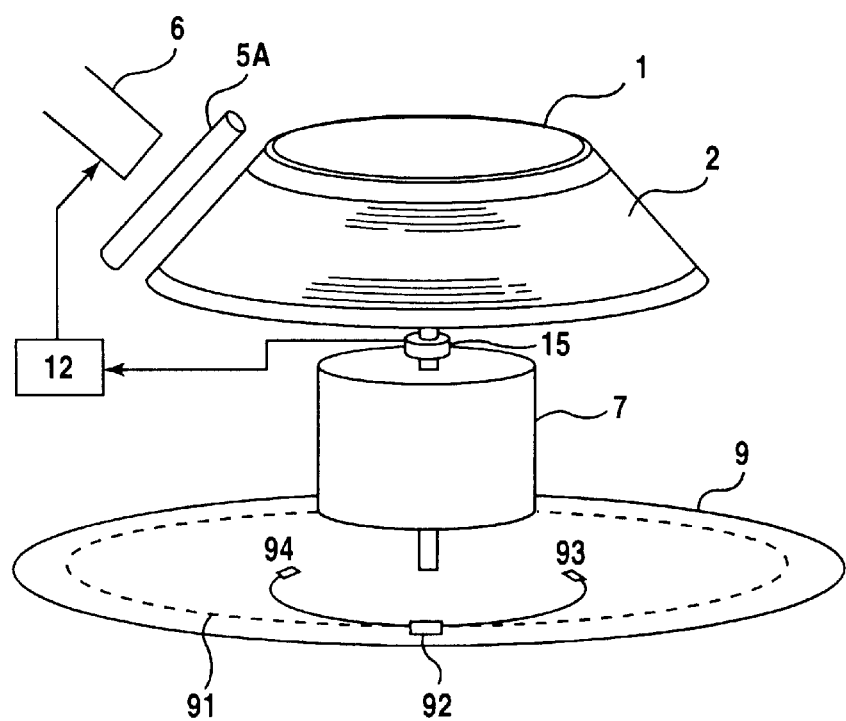
FIG. 4 illustrates another example of apparatus for producing a CFBG in a second preferred embodiment of the present invention.
Figure 5:
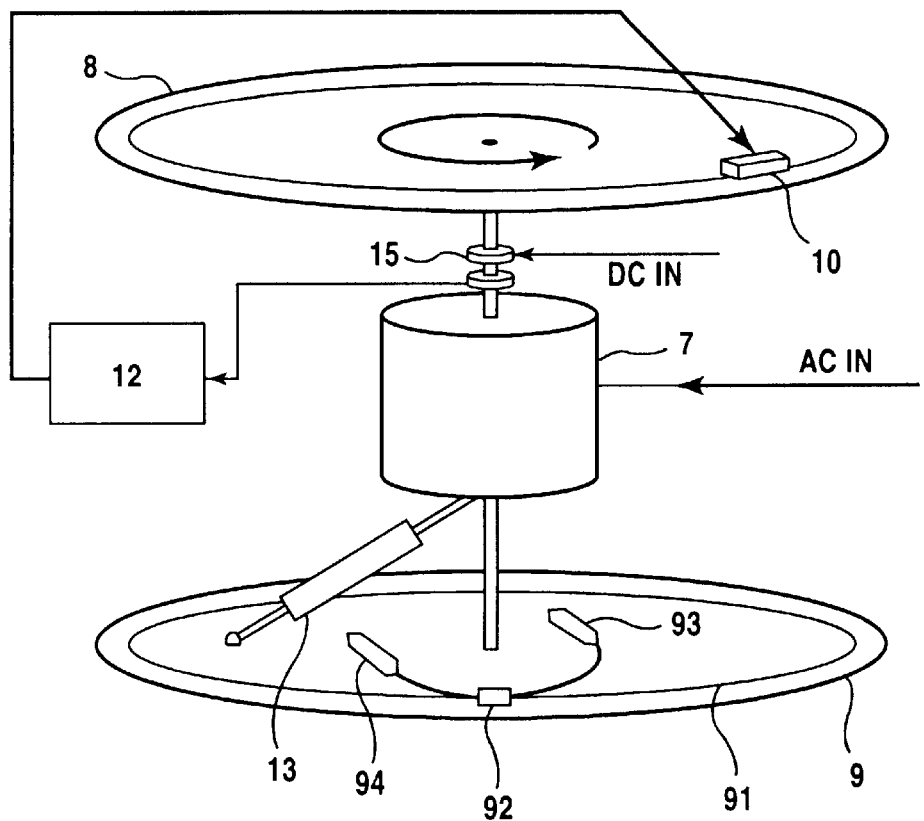
FIG. 5 illustrates an apparatus for preparing a full circle protractor by utilizing a ring-laser gyroscope, for use in the first to third preferred embodiments.
Figure 9A:
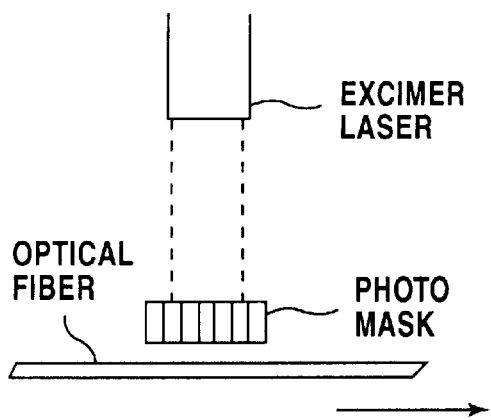
FIGS. 9A and 9B illustrate conventional methods for producing a CFBG.
Figure 9B:
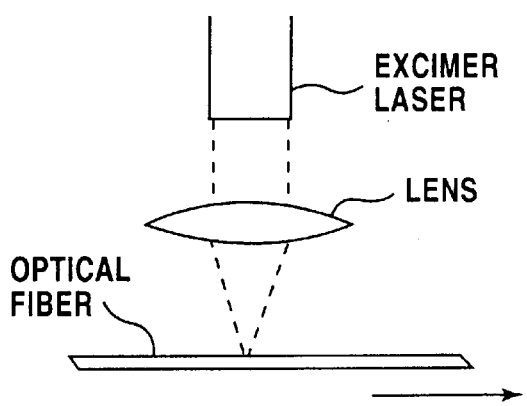

FIGS. 3 and 4 schematically illustrate two examples of apparatus for producing a CFBG provided in the second embodiment of the present invention. In FIG. 3, a full circle protractor 8 is used for the dividing mechanism, which is the same as that shown in FIG. 2. In FIG. 4, a ring-laser gyroscope 9 is used for the dividing mechanism. FIG. 5 shows an apparatus for producing the full circle protractor 8 by utilizing the ring-laser gyroscope 9.

In FIGS. 3 and 4, the reference numeral 1 denotes a conical bobbin, 2 an optical fiber wound in a spiral groove formed on the surface of the conical bobbin 1, 5A a cylindrical lens, 6 a UV laser, 7 a motor, 12 a pulse shaping circuit for causing the UV laser 6 to blink. The conical bobbin 1 is the same as that shown in FIG. 1. The UV laser 6 is placed with its axis perpendicular to the surface of the conical bobbin 1, interposed by the cylindrical lens 5A for focusing UV rays in a line along one of generating lines of the conical bobbin 1. The optical fiber is irradiated at every crossings with the line of the focussed UV rays, resulting in the gratings which are the same as those produced by using the photomask 4.

Now, an explanation will be given about the ring-laser gyroscope 9 with reference to FIGS. 4 and 5. The ring-laser gyroscope 9 comprises a resonant optical path 91, a two-way coupler 92, a light source 93 for pumping the resonant optical path 91, and a photodiode 94. The resonant optical path 91 is made up of a single-mode optical fiber with the core doped with rare earth such as erbium, connected at its both ends with the two-way coupler 92 to form an endless ring. The light source 93 and the photodiode 94 are also connected to the resonant optical path 91 through the two-way coupler 92. All the components of the ring-laser gyroscope 9 are arranged and fixed on a disk rotated by a motor 7.

When the ring-laser gyroscope 9 rotates about its axis of rotation, opposite progressive waves are generated in the resonant optical path 91 by a well-known mechanism, which produce an optical beat signal due to interference. The frequency of the beat signal for each round of the ring-laser gyroscope 9 is a machine constant, which is proportionate to an area (an effective area) surrounded by the resonant optical path 91, projected onto a plane orthogonal to the axis of rotation.

The actual frequency of the beat signal is a product of the rotational speed of the ring-laser gyroscope 9 and the machine constant. The beat signal is detected and converted into an electrical signal by the photodiode 94, and fed to a pulse shaping circuit 12 through a slip ring 15. The output signal from the pulse shaping circuit 12 is fed to the UV laser 6 to make the same to blink.

One way of adjusting the machine constant of the ring-laser gyroscope 9 is to vary the effective area. This can be done by altering a slant angle of the ring-laser gyroscope 9 with a slant adjuster 13 shown in FIG. 5. The slant adjuster 13 may be fabricated out of appropriate adjusting screws, electrostrictive elements, etc.

Any type of the ring-laser gyroscope 9 may be used, as far as it generates a beat signal in which the beat frequency is proportionate to the rotational speed of the motor 7. One with multiple laser tubes on each side of a polygon, or another with a semiconductor optical amplifier connected with a non-dope single-mode optical fiber in a ring, will be usable.

The actual frequency $f_b$ of the beat signal is given by the following equation, $$f_b = (4A_N/L_N) \times (\omega/\lambda_n)$$

where, $A_N$ is the total area surrounded by an erbium doped fiber wound N times to form the resonant optical path 91, $L_N$ the total length of the erbium doped fiber, $\omega$ the angular rotational speed of the ring-laser gyroscope 9 or the motor 7, $\lambda_n$ the wave-length of a standing wave in the erbium doped fiber, ie 1.057 $\mu$m (=1.532 $\mu$m/1.45, where 1.532 $\mu$m is the wave-length of erbium oscillation in vacuum, and 1.45 is the refractive index of fiber).

When the resonant optical path 91 is formed in a circle having the diameter d, and the rotational speed of the motor 7 is denoted by n [RPS], $$4 A_N/L_N = d,$$

and $$v_b = f_b/n = 2\pi d/\lambda_n$$

where, $v_b$ represents the frequency of the beat signal for each round of the ring-laser gyroscope 9, ie the machine constant. Assuming that $L_N$=6.850 meters and N=20 turns, we obtain d=109 mm and $v_b$=648,060. By multiplying $v_b$ by ¼, we obtain 162,150, which is fairly close to the aimed number of division, 162,000.

To make (¼) $v_b$ approach to 162,000, a slant angle $\theta$ of the ring-laser gyroscope 9 ($\theta$=0, when the gyroscope 9 is placed perpendicular to the axis of the motor 7) is adjusted by manipulating the slant adjuster 13. In this case, we obtain $\theta \neq 47$ angular minutes.

Third Embodiment

In the third embodiment of the production method according to the present invention, still another apparatus for producing the CFBG is provided, which comprises, a conical bobbin shaped in a frustum of a right circular cone having a predetermined vertex angle and a height between predetermined first and second diameters, provided with a spiral groove formed on the surface thereof for winding an optical fiber, a dividing mechanism for generating a blinking signal every time the conical bobbin together with the dividing mechanism rotates a unit angle, the unit angle being a quotient in division of one revolution by a predetermined integer, a motor for rotating the conical bobbin and the dividing mechanism together around a common axis, a UV laser placed outside the conical bobbin, pointing perpendicular to the surface of the conical bobbin, interposed by a convex lens for focusing laser rays of the UV laser in a spot in the optical fiber wound on the conical bobbin, a tracking mechanism for moving the UV laser together with the convex lens parallel to a generating line of the conical bobbin, so that the focused spot tracks the optical fiber which is moving in appearance on the surface of the conical bobbin in rotation, and a blinker mechanism for causing the UV laser to blink responsive to the blinking signal from the dividing mechanism.

Figure 6:
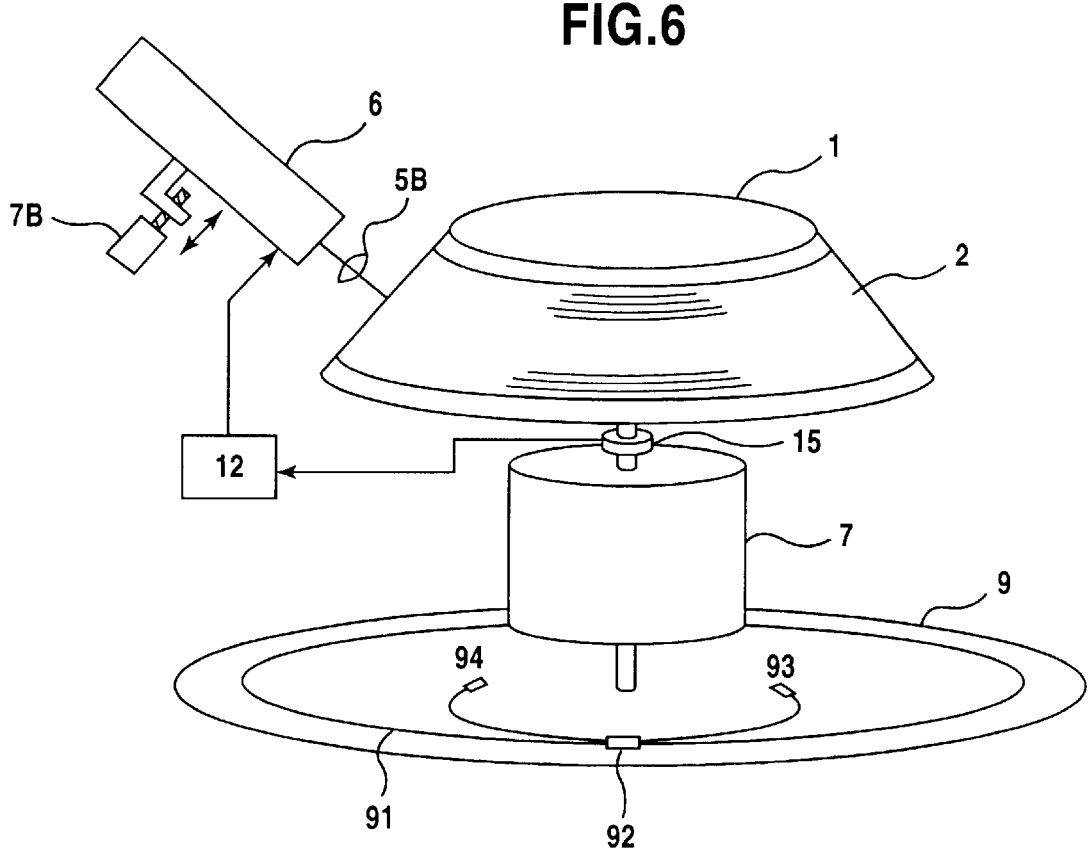
FIG. 6 illustrates an example of apparatus for producing a CFBG in a third preferred embodiment of the present invention.
Figure 7:
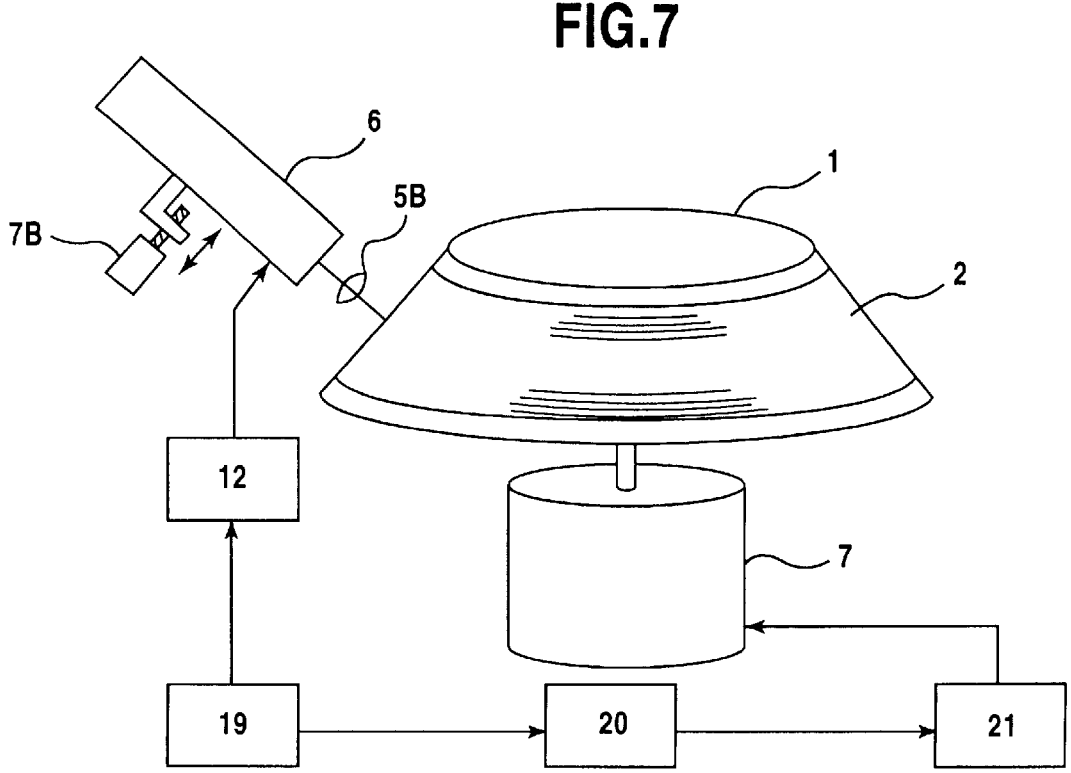
FIG. 7 illustrates another example of apparatus for producing a CFBG in a third preferred embodiment of the present invention.
Figure 8:
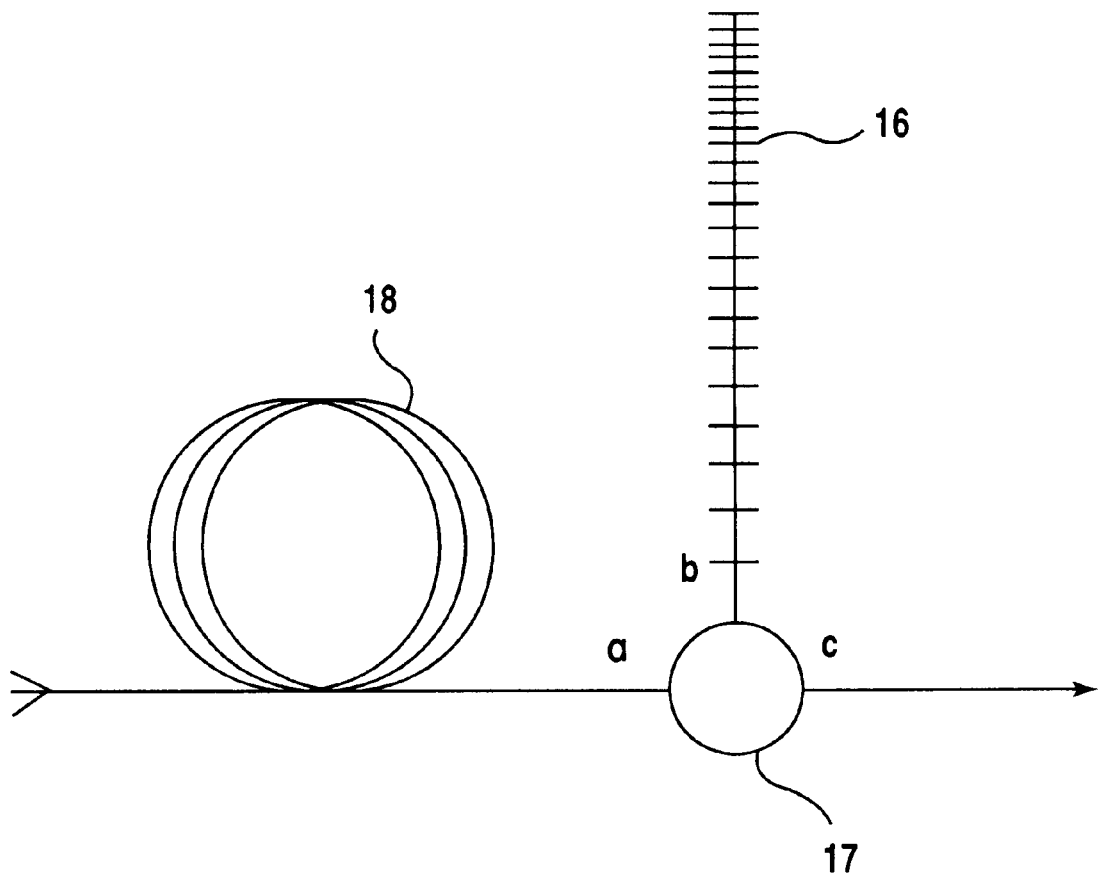
FIG. 8 illustrates an optical circuit for compensating dispersion with a CFBG.

FIGS. 6 and 7 schematically illustrate two examples of apparatus for producing a CFBG provided in the third embodiment of the present invention. In FIG. 6, a ring-laser gyroscope 9 is used for the dividing mechanism. In FIG. 7, a pulse generating circuit 19 is used in place of the dividing mechanism.

In FIGS. 6 and 7, the UV laser 6 is placed with its axis perpendicular to the surface of the conical bobbin 1, interposed by a convex lens 5B for focusing UV rays of the UV laser 6 in a spot on a core of the optical fiber 2 wound on the conical bobbin 1. The UV laser 6 together with the convex lens 5B is moved parallel to one of generating lines of the conical bobbin 1 by the tracking mechanism including a tracking motor 7B and a control circuit (not illustrated), to cause the focused spot to track the optical fiber 2 which is moving in appearance on the surface of the conical bobbin 1 in rotation. The ring-laser gyroscope 9 and the pulse shaping circuit 12 shown in FIG. 6 are the same as those shown in FIGS. 4 and 5 in the second embodiment.

In FIG. 7, a conventional AC motor shown in FIG. 6 is replaced with a multipolar synchronous motor 7, and a pulse signal generated by a pulse generating circuit 19 is supplied to the motor 7, and simultaneously, to the UV laser 6 as the blinking signal.

The pulse generating circuit 19 generates a predetermined number of pulse signals per second, while a pre-set counter 20 generates a single pulse signal every time it receives n pulse signals (n is a pre-set value) from the pulse generating circuit 19, to invert a flip-flop 21. The multipolar synchronous motor 7 rotates one round every time it receives m (an integer) pulse signals from the flip-flop 21. Thus, the conical bobbin 1 rotates one round for every n×m pulse signals generated by the pulse generating circuit 19, while the pulse shaping circuit 12 gives n×m blinking signals to the UV laser 6. This results in that gratings are produced in the optical fiber 2 wound on the conical bobbin 1 at a constant angular interval of 360°/(n×m), which is variable only by changing the pre-set value n in the pre-set counter 20.

As described above, in the apparatuses shown in FIGS. 6 and 7, irradiation of the optical fiber is carried out at the same angular position in every revolution of the conical bobbin 1. This means that a series of irradiated points of the optical fiber on the conical bobbin 1 are arranged on the same generating line of the conical bobbin 1, which is, in principle, the same result as obtained by using the photomask 4.

However, in the present embodiment, the requirement for dividing one revolution of the conical bobbin 1 by an integer may be relaxed compared to the photomask 4. Even when the division of 360° by an integer causes an error (a divisional error), formation of the gratings is carried out as it is. As a result, the loci of the irradiated points on the optical fiber may produce a set of lines, each running askew on the surface of the conical bobbin 1.

When the divisional error occurs in producing the photomask 4, the error is accumulated to produce an irregular interval between the first and last slits which is smaller than a standard interval produced throughout the photomask 4. However, in the present embodiment, uniformity of the grating intervals is maintained, because the divisional error is uniformly distributed in each of the grating interval, and such grave drawback as multiple reflection, experienced occasionally in the CFBG produced by using the photomask 4, is effectively prevented.

In addition, in the present embodiment, irradiation of the optical fiber 2 with the UV laser 6 may be completed in a relatively short time, because the UV rays are concentrated to a small spot with a high irradiation efficiency. This is advantageous specifically in utilizing an excimer laser for the UV light source, whose life is relatively short.

Fourth Embodiment

In the fourth embodiment, a method for producing a "CFBG cone" is provided, in which the CFBG produced by the method according to the present invention is treated to make it self-sustaining, and thereafter, separated from the conical bobbin.

When the CFBG is used for dispersion compensation as described in the above, it is convenient to have the CFBG in a compactly wound state like one wound on the conical bobbin. However, the conical bobbin does nothing to do with the compensation, besides adverse effects of a mechanical stress on the CFBG wound on the conical bobbin.

Therefore, it is preferable to remove the conical bobbin from the produced CFBG by one way or another, and treat to make it self-sustaining. Let us name such an article as a "CFBG cone". The CFBG cone, as it is, is usable as a component for the dispersion compensating circuit. To make the conical bobbin removable from the CFBG, it is preferable to fabricate the conical bobbin with material which is thermally melting, thermally shrinkable, or soluble by a solvent.

In treating the CFBG, it is preferable to coat the CFBG with a composite containing a resin having a refractive index higher than that of the clad of the optical fiber and fine particles having a further higher refractive index than that of the resin. The resin may be of a UV-cure type, and the fine particles may be of gallium arsenide, a halogen-carbon compound or a silicon-carbon compound. By coating the CFBG with the composite, stray light emitted from the core to the clad of the optical fiber is led to a resin layer and caught by the fine particles, in which a number of reflections occur. Since the distances travelled by the stray light rays and phase angles thereof are randomized, and the intensity of the stray light rays is attenuated in the process of repeated reflections in the fine particles, no strong interference causing transmission troubles occurs even when the stray light rays return again to the core, by chance.

What is claimed is:

1. A method for producing a chirped in-fiber Bragg grating (CFBG), wherein an interval between gratings varies continuously depending on a location of the gratings observed along an optical fiber, comprising, a first step of winding the optical fiber in a spiral groove formed around a conical bobbin which is shaped in a frustum of a right circular cone having a predetermined vertex angle and a height between predetermined first and second diameters, and a second step of irradiating the optical fiber with ultraviolet (UV) rays at every crossing of the optical fiber with a predetermined number of uniformly distributed generating lines of the conical bobbin, each extending radially on a surface of the conical bobbin from an imaginary vertex thereof.

2. A method for producing a CFBG according to claim 1, wherein a winding pitch of the spiral groove varies depending on a location on the surface of the conical bobbin.

3. A method for producing a CFBG according to claim 1, further comprising a third step of coating the CFBG with a composite containing a resin having a refractive index higher than that of a clad of the optical fiber, and fine particles having a further higher refractive index than that of the resin.

4. A method for producing a CFBG according to claim 3, wherein the conical bobbin is made of material having either one of properties of thermal meltability, thermal shrinkability and solvent solubility.

5. A method for producing a CFBG according to claim 4, further comprising a fourth step of removing the conical bobbin from the CFBG, by utilizing a property of material constituting the conical bobbin.

6. An apparatus for producing a CFBG, comprising, a conical bobbin shaped in a frustum of a right circular cone having a predetermined vertex angle and a height between predetermined first and second diameters, provided with a spiral groove formed on a surface thereof for winding an optical fiber, a photomask shaped in a thin and hollow frustum of a right circular cone for covering the surface of the conical bobbin closely, the photomask being provided with a predetermined number of uniformly distributed light passing slits, each extending radially on a surface of the photomask from an imaginary vertex thereof, a motor for rotating the conical bobbin and the photomask together around a common axis, and a UV laser placed outside the conical bobbin, pointing perpendicular to the surface of the conical bobbin, interposed by a cylindrical lens for focusing laser rays of the UV laser in a line along a generating line of the conical bobbin.

7. An apparatus for producing a CFBG, comprising, a conical bobbin shaped in a frustum of a right circular cone having a predetermined vertex angle and a height between predetermined first and second diameters, provided with a spiral groove formed on a surface thereof for winding an optical fiber, dividing means for generating a blinking signal every time the conical bobbin together with the dividing means rotates a unit angle, a predetermined integer times the unit angle making one revolution, a motor for rotating the conical bobbin and the dividing means together around a common axis, a UV laser placed outside the conical bobbin, pointing perpendicular to the surface of the conical bobbin, interposed by a cylindrical lens for focusing laser rays of the UV laser in a line along a generating line of the conical bobbin, and blinker means for causing the laser rays to blink responsive to the blinking signal from the dividing means.

8. An apparatus for producing a CFBG, comprising, a conical bobbin shaped in a frustum of a right circular cone having a predetermined vertex angle and a height between predetermined first and second diameters, provided with a spiral groove formed on a surface thereof for winding an optical fiber, dividing means for generating a blinking signal every time the conical bobbin together with the dividing means rotates a unit angle, the unit angle being a quotient in division of one revolution by a predetermined integer, a motor for rotating the conical bobbin and the dividing means together around a common axis, a UV laser placed outside the conical bobbin, pointing perpendicular to the surface of the conical bobbin, interposed by a convex lens for forming a focused spot of laser rays of the UV laser, on the optical fiber wound on the conical bobbin, tracking means for moving the UV laser together with the convex lens parallel to a generating line of the conical bobbin, so that the focused spot tracks the optical fiber which is moving in appearance on the surface of the conical bobbin in rotation, and blinker means for causing the laser rays to blink responsive to the blinking signal from the dividing means.

* * * * *

UNITED STATES PATENT AND TRADEMARK OFFICE
CERTIFICATE OF CORRECTION

PATENT NO. : 6,160,261
DATED : December 12, 2000
INVENTOR(S) : Hiroyuki HOSHINO

It is certified that error appears in the above-identified patent and that said Letters Patent is hereby corrected as shown below:

On the title page of the patent in Item [54] change the title, "METHOD FOR PRODUCING CHIRED IN-FIBER BRAGG GRATING" to be -- METHOD FOR PRODUCING CHIRPED IN-FIBER BRAGG GRATING --

Signed and Sealed this

Twenty-second Day of May, 2001

Attest:

NICHOLAS P. GODICI

Attesting Officer

Acting Director of the United States Patent and Trademark Office